United States Patent Office 3,173,073
Patented Mar. 9, 1965

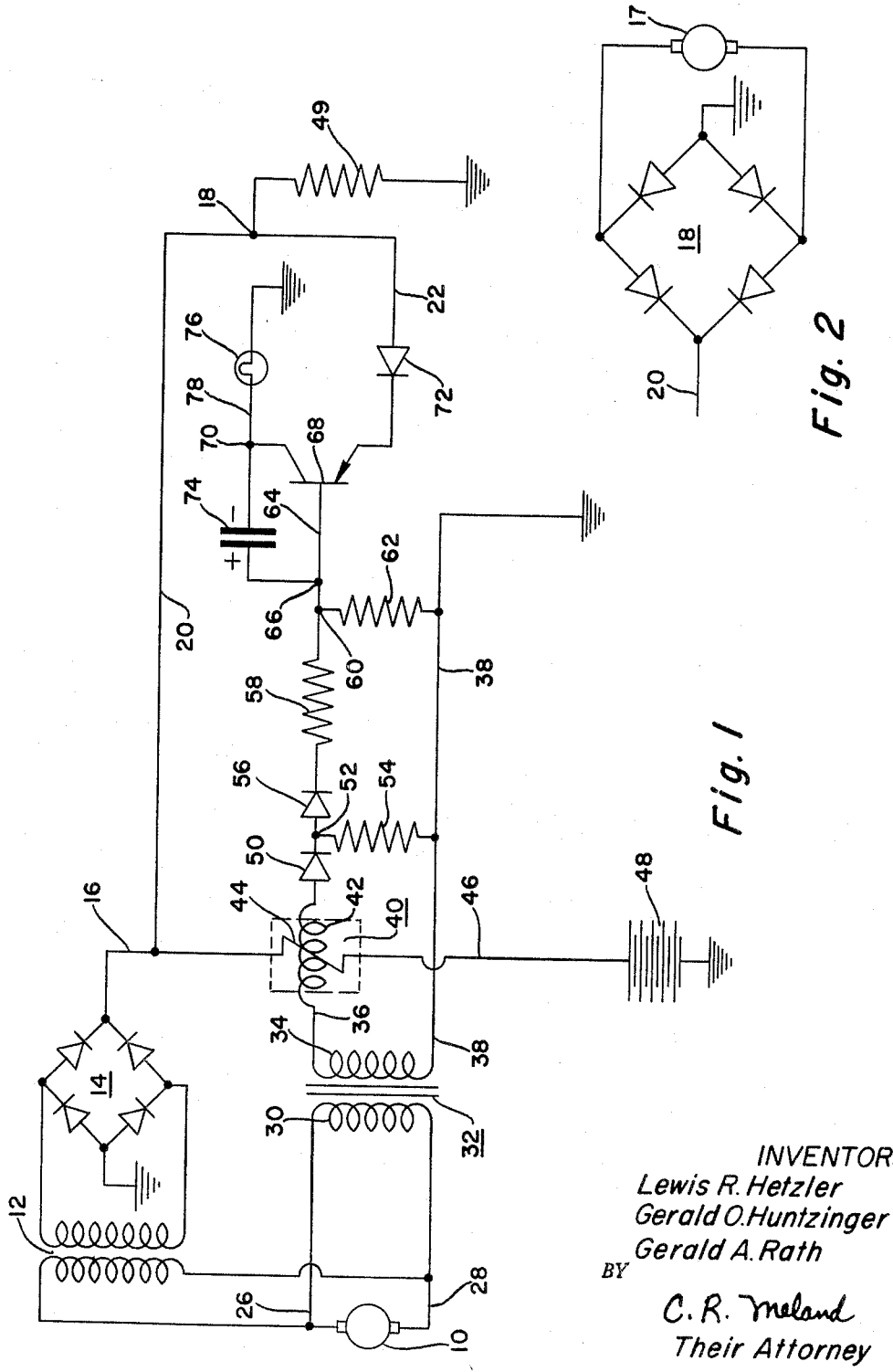

3,173,073
BATTERY DISCHARGE INDICATOR
Lewis R. Hetzler, Gerald O. Huntzinger, and Gerald A. Rath, all of Anderson, Ind., assignors to General Motors Corporation, Detroit, Mich., a corporation of Delaware
Filed Mar. 25, 1960, Ser. No. 17,544
5 Claims. (Cl. 320—48)

This invention relates to a battery discharge indicating circuit for use with motor vehicle electrical systems and the like.

One of the objects of this invention is to provide an indicating circuit for a battery charging system wherein an indicating device such as a lamp is energized when a discharge current is flowing from the battery and becomes deenergized when charging current is being supplied to the battery.

Another object of this invention is to provide an indicating circuit for an electrical system that includes a D.C. power source and an A.C. generator, the D.C. power source being connected to supply charging current to a battery, the indicating system including means for sensing discharge current flowing from the battery and an absence of output voltage of the A.C. generator.

A further obeject of this invention is to provide an indicating system for a battery charging circuit that includes an electrically energizable indicating device which is energized through a semi-conductor such as a transistor when a battery discharge current is present.

Still another object of this invention is to provide a battery discharge indicating system wherein a lead wire carrying either battery discharge current or battery charging current is inductively coupled with a coil winding that is wound on a core having a very flat-topped hysteresis loop, and wherein the coil winding is connected in a circuit that controls the energization of an indicating device such as a lamp.

Further objects and advantages of the present invention will be apparent from the following description, reference being had to the accompanying drawings, wherein preferred embodiments of the present invention are clearly shown.

In the drawings:

FIGURE 1 is a schematic electrical circuit diagram of a battery discharge indicating system made in accordance with this invention.

FIGURE 2 illustrates a modified arrangement for supplying power to the indicating circuit of FIGURE 1.

Referring now to the drawing, the reference numeral 10 is used to dseignate an alternating current generator which is connected to supply power to a transformer 12 having a secondary winding connected with bridge rectifier 14. One output terminal of the bridge rectifier 14 is grounded whereas the other output terminal is connected with lead wire 20 via lead wire 16.

It is seen that the A.C. generator 10 is connected across lead wires 26 and 28 and preferably has a 115 volt, 400 cycle output. The lead wires 26 and 28 are connected across the primary winding 30 of a step-down transformer designated in its entirety by reference numeral 32. The transformer has a secondary winding 34 which is connected with lead wires 36 and 38, the lead wire 38 being connected to ground as shown. The transformer, for example, may step the voltage down so that 30 volts R.M.S. appears across the secondary winding 34.

In the circuit as thus far described it can be seen that the A.C. generator 10 supplies A.C. power to the circuit connected with secondary winding 34 and D.C. power to lead wire 20 through bridge rectifier 14. If desired the D.C. power may be supplied by a separate D.C. generator or by the circuit illustrated in FIGURE 2 that includes an A.C. generator 17 and bridge rectifier 18. If the circuit of FIGURE 2 is used to supply D.C. power the generator 10 would supply only A.C. power and the transformer 12 and bridge rectifier 14 would, of course, be eliminated.

A current sensing reactor generally designated by reference numeral 40 is provided which includes a reactive coil winding 42 and a length of lead wire 44 which passes through the coil winding 42 and its core and is inductively coupled thereto. The core material of coil winding 42 is constructed to provide a very flat-topped hysteresis loop, and is preferably toroidal in shape with the conductor 44 passing through the core. This type of reactor is sometimes termed as a variable reset element since it resets by a controlling current as will become more readily apparent hereinafter. It is seen that the conductor 44 that passes through the toroidal coil winding 42 and its core has one end thereof connected with lead wire 20 and has its opposite end connected with lead wire 46. Lead wire 46 is connected to one side of a storage battery 48, the opposite side of which is connected to ground, as shown. It will be appreciated that direct current will be supplied from generator 10 and bridge rectifier 14 to charge the battery 48 and that this charging current will pass in one direction through the conductor 44. On the other hand, when the battery 48 is supplying power to a direct current load 49, the current through the conductor 44 will be in an opposite direction and will be detected as will become more readily apparent hereinafter.

One side of coil winding 42 is connected with a pn junction semi-conductor diode 50 which may be a silicon diode. The opposite side of diode 50 is connected with a junction 52 and it is seen that a resistor 54 is connected between junction 52 and lead wire 38. Another pn junction semi-conductor diode 56 is connected between junction 52 and a resistor 58. The opposite side of resistor 58 is connected with junction 60 and a resistor 62 is connected between junction 60 and lead wire 38. A lead wire 64 connects the junctions 60 and 66 with the control electrode of a semi-conductor 68 which in this case takes the form of a transistor. The lead wire 64 is connected to the base electrode of the transistor whereas the collector electrode of the transistor is connected with junction 70. The emitter electrode of transistor 68 is connected to one side of another pn junction semi-conductor diode 72. The opposite side of this diode is connected with lead wire 22 which in turn is connected with conductor 16. It is seen that a condenser 74 is connected between junctions 66 and 70 and thus is connected across the base and collector electrodes of transistor 68.

The junction 70 is connected via lead wire 78 to one side of an electrically energizable indicating device which in this case takes the form of a lamp 76. The opposite side of lamp 76 is connected directly to ground as is apparent from the drawing.

In operation and assuming that power source 10 is in operation and that charging current is being supplied to the battery 48 through the conductor 44, the lamp 76 will be extinguished. When power source 10 is supplying voltage to the primary winding 30 of transformer 32, an A.C. voltage appears across leads 36 and 38 which is rectified by the rectifier 50. As noted hereinbefore, the core of coil winding 42 has a very flat-topped hysteresis loop. As a result, when the rectifier 50 passes current during each positive half-wave of applied voltage, the core of coil winding 42 becomes saturated. This core will remain saturated unless it is reset by a controlling current of discharge polarity during the negative half-wave cycle of applied voltage from the transformer.

When the core is saturated, it will allow no further change in flux and therefore there can be no voltage developed across the winding 42. As a result, the peak positive transformer voltage is developed across resistor 54. This voltage is also applied to the base of the transistor 68 and is sufficient in magnitude to drive the base positive with respect to the emitter. When this occurs, collector current in transistor 68 is cut off and there is no circuit for the lamp 76.

It is to be observed that if the power source 10 were not in operation, there would be no voltage developed across resistor 54 to drive the base of transistor 68 positive with respect to the emitter. If no voltage is available to drive the base positive with respect to the emitter, the transistor 68 would conduct from emitter to collector and the lamp 76 would become incandescent. The transistor conducts in this condition of operation because it is biased to conduction by current flowing from the positive side of battery 48, through conductors 46, 44, and 20, is through conductor 22, diode 72, the emitter-base circuit of transistor 68, conductor 64, resistor 62 and then to conductor 38 which is grounded. It thus can be seen that an absence of output voltage of power source 10 will be indicated by the lamp becoming incandescent.

If, however, there is a small discharge current flowing from the battery to the load 49, the magnetizing force thus produced is in a direction to reset the core of coil winding 42 to a point less than saturation during negative half-cycles of the voltage applied across lead wires 36 and 38. A voltage integral is then absorbed from the positive half-cycles of voltage applied to leads 36 and 38 and does not appear across resistor 54. As a result, the voltage developed across resistor 54 and applied to the transistor base becomes insufficient to cut off the transistor. The base current of transistor 68 which flows through resistor 62 causes the transistor to saturate and applies full voltage to the indicator lamp 76 indicating a discharge current in the battery circuit.

The circuit of this invention is designed to indicate both small discharge currents, for example, .5 of an amp as well as large discharge current, for example, 35 amps. Large discharge currents produce an excessive resetting magnetizing force whcih drives the core of coil winding 42 into negative saturation. As a result, winding 42 cannot absorb a voltage integral from the positive half-cycles of the voltage applied across lead wires 36 and 38 until a sufficient current is drawn through winding 42 to cancel the excessive magnetizing force produced in conductor 44. Thus, if it were not for resistor 54, the reactor or magnetic amplifier 40 would have an output sufficient to drive the base of transistor 68 positive, cutting off the transistor and causing a false indication. Resistor 54 is chosen such that at the maximum expected discharge current, say 35 amps, resistor 54 will draw sufficent current through winding 42 to cancel the excessive magnetizing force produced by conductor 44 at a voltage less than that required to drive the base of the transistor positive. Thus the transistor remains turned on applying full voltage to the indicating lamp when a large discharge current exists. This resistor will not prevent the cutting off of the transistor when charging current is being supplied to the battery since under this condition, the output of the magnetic amplifier is greater in magnitude than when a large discharge current is flowing and therefore is sufficient to cause the base of the transistor to be driven positive with respect to the emitter.

The condenser 74 serves as a filter to maintain a positive base voltage during the periods of negative half-cycles from the transformer 32. This condenser also provides a time delay in the lighting of the lamp 76 when a discharge current suddenly appears through conductor 44. When a discharge current appears, the voltage across resistor 54 is reduced and rectifier 56 prevents current flow from the transistor portion of the circuit toward the current sensing portion. The condenser 74 then maintains the positive voltage on the base of transistor 68 thus keeping the light extinguished for a short period of time.

The function of resistor 58 is to limit peak charging currents into the condenser 74 to safe values for other components of the circuit. The diode 72 in the positive line 22 of the D.C. power circuit is used to protect the unit against negative transient voltages up to approximately 250 volts.

It will be apparent from the foregoing that a system has been provided which indicates a discharge current in conductor 44 and also indicates an absence of power from power source 10. This control is provided by the core of coil winding 42 having the flat-topped hysteresis loop which is connected to control the conduction of the transistor 68. It is, of course, apparent that the energization of lamp 76 is controlled by the emitter to collector circuit of transistor 68 which is energized by direct current from lead wire 22.

While the embodiments of the invention as herein disclosed constitute a preferred form, it is to be understood that other forms might be adopted.

What is claimed is as follows:

1. An electrical system comprising, a source of direct current, first and second conductors connected with opposite sides of said source of direct current, a battery connected across said source of direct current, an electrical load connected across said first and second conductors, a semiconductor having first, second and third terminals, the conduction of said semiconductor between its first and third terminals being controlled by the relative potential of first and second terminals, an electrically energizable indicating device responsive to an electrical potential, means connecting said indicating device and the first and third terminals of said semiconductor in series across said first and second conductors, means connecting said first and second terminals of said semiconductor across said first and second conductors, the potential of said first and second conductors being of such a polarity as to bias said semiconductor to a conductive state to thereby complete a circuit for said electrically energizable indicating device, a magnetic amplifier including a reactor winding, said first conductor being magnetically coupled with said reactor winding, a source of alternating current, a diode, a control circuit having direct current output terminals including said diode and said reactor winding connected across said source of alternating current, said reactor winding having a lower impedance when said battery is being charged through said first conductor by said direct current source than when said battery is discharging through said first conductor and through said electrical load, said control circuit developing a control voltage at the direct current output terminals of said control circuit, said control voltage varying in magnitude in accordance with the impedance of said reactor winding, and means connecting said direct current output terminals of said control circuit respectively with said second terminal of said semiconductor and said second conductor, said control voltage having a magnitude sufficient to bias said semiconductor to a nonconductive condition to deenergize said electrically energizable indicating device when said battery is being charged, the magnitude of said control voltage being insufficient to bias said semiconductor to a nonconductive condition when said battery is discharging.

2. The electrical system according to claim 1 where the three terminal semiconductor is a transistor having emitter, collector and base electrodes which correspond respectively to the first, third and second terminals of said semiconductor.

3. The electrical system according to claim 1 where the direct current source is a bridge rectifier energized from the source of alternating current.

4. The electrical system according to claim 1 where a capacitor is connected across the second and third terminals of said semiconductor.

5. An electrical system comprising, a battery, a source of direct current, first and second conductors connected with opposite sides of said source of direct current, means connecting said battery across said first and second conductors, a load, means connecting said load across said first and second conductors, a transistor having emitter, collector and base electrodes, an electrically energizable indicating device responsive to an electrical potential, means connecting the emitter and collector electrodes of said transistor and said indicating device in series across said first and second conductors whereby said transistor controls energization of said indicating device, means connecting the emitter and base electrodes of said transistor across said first and second conductors, the potential appearing across said first and second conductors biasing said transistor to a conductive state in its emitter-collector circuit, a magnetic reactor including a reactor winding, said first conductor being magnetically coupled with said reactor winding, the impedance of said reactor winding being higher when said battery is discharging through said load and through said first conductor than when said battery is being charged through said first conductor by said source of direct current, a source of alternating current, a diode, and a control circuit having direct current output terminals including said reactor winding and said diode connected across said source of alternating current, said output terminals being connected between the base electrode of said transistor and said second conductor, the output terminals of said control circuit having a control voltage which is sufficient to bias said transistor to its nonconductive condition when said battery is being charged, said control voltage having a value that is not sufficient to bias said transistor to a nonconductive condition when said battery is discharging.

References Cited in the file of this patent

UNITED STATES PATENTS

| | | |
|---|---|---|
| 2,324,188 | Beetem | July 13, 1943 |
| 2,326,313 | Trucksess | Aug. 10, 1943 |
| 2,772,410 | Logue et al. | Nov. 27, 1956 |
| 2,836,713 | Scott et al. | May 27, 1958 |
| 2,860,196 | Schultz | Nov. 11, 1958 |
| 2,902,547 | Rowley et al. | Sept. 1, 1959 |
| 2,953,741 | Pittman et al. | Sept. 20, 1960 |
| 3,047,727 | McAllise | July 31, 1962 |

FOREIGN PATENTS

| | | |
|---|---|---|
| 642,295 | Great Britain | Aug. 30, 1950 |